Oct. 14, 1969　　　P. R. GUENARD　　　3,473,126
SIGNAL JAMMING DEVICE COMPRISING A SINGLE NOISE GENERATOR

Filed June 7, 1965

INVENTOR:
PIERRE R. GUENARD

BY
ATTORNEY

United States Patent Office 3,473,126
Patented Oct. 14, 1969

3,473,126
SIGNAL JAMMING DEVICE COMPRISING A SINGLE NOISE GENERATOR
Pierre R. Guenard, Paris, France, assignor to CSF-Compagnie Generale de Telegraphie Sans Fil, a corporation of France
Filed June 7, 1965, Ser. No. 461,859
Claims priority, application France, June 12, 1964, 978,076
Int. Cl. H04k 3/00
U.S. Cl. 325—132     6 Claims

ABSTRACT OF THE DISCLOSURE

This invention relates to signal jamming devices and comprises a single noise generator connected through separate paths to two aerials having mutually perpendicular directions of polarization and delay means in one of said paths to provide a non-coherent relationship between the signals transmitted by the two aerials. Special amplifier means may also be provided in each of the paths to increase the signal strength while still maintaining the random amplitude variation in each of the signal paths. The signals in each of the paths may be provided to a hybrid junction device to energize the two aerials with signals representing the sum and difference of the signals in each of the separate paths.

---

It is known that when a signal is disturbed or "jammed" by means of a single source of noise, it is easy at the reception point of the signal to eliminate the jamming in spite of the random character thereof. Indeed the noise is generally transmitted through an aerial or antenna that radiates with a certain polarization; therefore, if the receiving aerial or antenna is arranged to have a polarization perpendicular to that of the transmitter, the jamming of the signal is eliminated.

Things are nearly the same when the noise signal is conveyed or fed over a double path and is transmitted by means of two areals or antennae having mutually perpendicular polarizations. The signals from the two aerials then are coherent with one another and it is therefore possible at the reception point first to find out the way of eliminating the jamming that has one polarization and thence to deduce therefrom means for eliminating the jamming signal having the other perpendicular polarization, thus eliminating substantially the entire jamming.

Such a system of jamming is consequently ineffective and it may be rendered effective only by destroying the coherence between the two noise signals. This can be achieved when using two distinct, completely independent noise generators, but then the cost of installation is significantly increased.

The present invention has as its object a signal jamming device that comprises a single source of noise, but provides the same operational advantages as the prior art devices that comprise two distinct noise generators.

Accordingly, it is an object of the present invention to provide a highly efficient signal-jamming device that may be realized at a relatively low cost.

In accordance with the present invention, there is provided a signal jamming device comprising a single source of noise, means for conveying the noise signal through two channels, a wave delay circuit inserted in one of said channels for delaying the signal thereof, and two aerials connected to the output of the two channels, respectively, said two aerials having mutually perpendicular polarizations.

The efficiency of this arrangement is due to the fact that the coherence or correlation between the signals transmitted through the two aerials is destroyed by the delay circuit.

Figure 1:
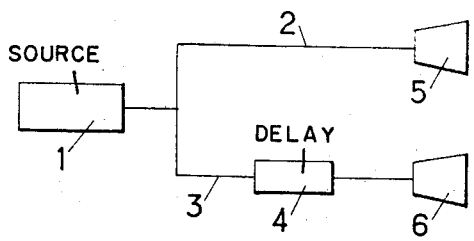
Figure 2:
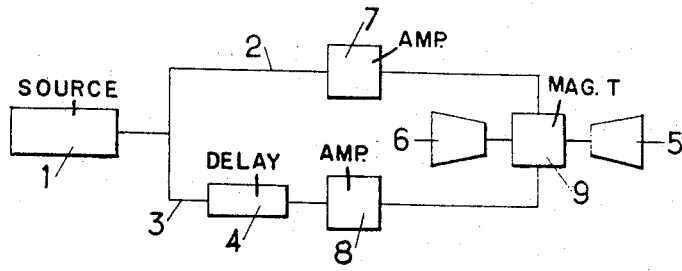

The invention will be more fully understood from the following description taken in connection with the accompanying drawing, wherein:

FIGURE 1 represents diagrammatically a jamming device in accordance with the present invention; and FIGURE 2 represents diagrammatically an improved embodiment of a jamming device in accordance with the present invention that permits obtaining high-power noise signals for highly efficient signal jamming in accordance with the principle of the invention.

Referring now to the two figures of the drawing wherein the like reference numerals are used throughout the two views to designate like parts and more particularly to FIGURE 1, reference numeral 1 designates a single source of noise, whose output is split into two channels 2 and 3. In accordance with the present invention, a microwave delay line 4 is inserted into one of the channels, for example, in channel 3. The delay time of the line may be of the order of the inverse of the band width covered by the signal receiver that has to be jammed. The output of channel 2, on the one hand, and that of the delay line 4, on the other, are connected respectively to two aerials 5 and 6 having mutually perpendicular polarizations.

In the arrangement of FIGURE 1, the noise signals are transmitted with a very low power, corresponding to that of noise sources known in the art. It may therefore be necessary to amplify these signals. Now, if high efficiency amplification is desired such as obtainable with M-type amplifiers, these amplifiers cut down or clip the peaks of the amplified signal curve; consequently, the spectrum components of the output curve still have random frequencies, but their amplitude has no longer random values, since the amplitude of the different components have been equalized by the amplitude limiting action of the amplifiers. Thus, a portion of the random character of the noise signal is suppressed by the amplification, and therefore these noise signals may be easier to overcome in the receiver.

The arrangement shown by the schematic diagram of FIGURE 2 has as its object the elimination of the forementioned inconvenience.

This arrangement comprises again the source 1, the channels 2 and 3, and the delay line 4. Each channel 2, 3, provides an output signal for a high efficiency amplifier operating under saturation conditions; that is, under conditions of peak limiting or clipping. The amplifiers, designated in FIGURE 2 by reference numerals 7 and 8, are combined in a hybrid junction device 9, such as a magic T-type device, which comprises two input branches for the signals, one output branch for the sum of the two signals and one branch for the difference of the same. The output signals, i.e., the sum and difference of the input signals, respectively, are fed to the aerials 5 and 6 which have mutually crossed polarizations, as in FIGURE 1.

The operation of this device is based upon the fact that while amplifiers 7 and 8 provide signals in which only the frequencies are random, there exists no correlation between the frequency variations of these two signals owing to the action of delay line 4. The combinations of the sum and difference of such signals provide each a signal in which both the amplitude and the frequency are random. The aerials are consequently fed, like in FIGURE 1, by signals having no correlation therebetween, capable of jamming a desired signal, the power of these jamming signals being relatively high owing to the amplifiers 7 and 8.

While I have shown and described only two embodiments in accordance with the present invention, it is understood that the same is not limited thereto but is susceptible of numerous changes and modifications as known to a person skilled in the art; and I, therefore, do not wish to be limited to these details but intend to cover all such changes and modifications as are encompassed by the scope of the appended claims.

I claim:
1. A signal jamming device, comprising a single source of noise modulated carrier signal, two separate radiating means for radiating signals with different polarizations, first connecting means connecting said single source with one of said radiating means, second connecting means connecting said single source with the other of said radiating means, and wave retarding means in at least one of said connecting means for delaying the arrival of the noise modulated carrier signal from said single source at the respective radiating means with respect to the arrival of the noise modulated carrier signal at the other radiating means.

2. Signal jamming apparatus, in combination, comprising:
a generating source for generating a noise modulated carrier signal,
a first transmitter aerial polarized in a first direction,
a second transmitter aerial polarized in a second direction perpendicular to said first direction,
said first transmitter aerial being connected to said generating source;
signal delay means connecting said second transmitter aerial to said generating source for delaying said noise modulated carrier signal with respect to the noise modulated signal at said first transmitter aerial,
and said first transmitter aerial and said second transmitter aerial transmitting a non-coherent jamming signal.

3. The signal jamming apparatus according to claim 2 wherein the delay time of said signal delay means is substantially the inverse of the band width of the receiving means to be jammed.

4. The signal jamming apparatus according to claim 2 further comprising hybrid junction means interconnecting said first and said second transmitter aerials with said generating source and the output of said signal delay line means for producing two output signals, one of said output signals being the sum of said noise modulated carrier signal and the delayed noise modulated carrier signal, and the other signal being the difference of said noise modulated carrier signal and the delayed noise modulated carrier signal.

5. The signal jamming apparatus according to claim 4 further including first and second amplifier means, said first amplifier means interconnecting said generating source and said hybrid junction means, said second amplifier means interconnecting said hybrid junction means and said signal delay means, said first and second amplifier means maintaining the random variation in the amplitude of said noise modulated carrier signal.

6. The signal jamming apparatus according to claim 5 wherein said hybrid junction means comprises a magic T-type device having first and second input branches and first and second output branches, said first input branch being connected to said generating source, said second input branch being connected to the output of said delay line means, said first output branch being connected to said first transmitter aerial, and said second output branch being connected to said second transmitter aerial.

References Cited

UNITED STATES PATENTS

| 1,841,654 | 1/1932 | Korschemewsky | 325—154 |
| 1,853,021 | 4/1932 | Alexanderson | 325—154 |
| 2,401,575 | 6/1946 | MacAdam | 325—157 |
| 2,792,493 | 5/1957 | Duckett et al. | 325—33 |
| 2,814,777 | 11/1957 | Peters et al. | 325—132 |
| 3,014,985 | 12/1961 | Raisbeck | 179—1 |
| 3,111,668 | 11/1963 | Kuecken | 325—154 |

FOREIGN PATENTS

| 780,739 | 5/1935 | France. |

RALPH D. BLAKESLEE, Primary Examiner

U.S. Cl. X.R.

325—154, 157